United States Patent
Zhou et al.

(10) Patent No.: US 7,873,285 B2
(45) Date of Patent: Jan. 18, 2011

(54) ANTI CLIPPING CIRCUIT FOR LASER TRANSMITTERS

(75) Inventors: Shutong Zhou, Lansdale, PA (US); Richard A. Meier, Abington, PA (US)

(73) Assignee: General Instrument Corporation, Horsham, PA (US)

( * ) Notice: Subject to any disclaimer, the term of this patent is extended or adjusted under 35 U.S.C. 154(b) by 621 days.

(21) Appl. No.: 11/752,781

(22) Filed: May 23, 2007

(65) Prior Publication Data
US 2008/0292315 A1  Nov. 27, 2008

(51) Int. Cl.
H04B 10/04 (2006.01)

(52) U.S. Cl. .................................. 398/192; 398/182

(58) Field of Classification Search ......... 398/182–183, 398/192–194
See application file for complete search history.

(56) References Cited

U.S. PATENT DOCUMENTS 6,549,316 B2   4/2003  Blauvelt
2002/0063930 A1*  5/2002  Blauvelt ................. 359/161
2004/0056720 A1*  3/2004  Jansen et al. ............ 330/279

* cited by examiner

Primary Examiner—Leslie Pascal
(74) Attorney, Agent, or Firm—Larry T. Cullen

(57) ABSTRACT

This anti clipping circuit is for a laser transmitter used to transmit sub-carrier multiplexed signals for CATV applications. The circuit design is based on actual clipping measurements showing the specific time and duration of the clipping events is random. The individual clipping pulses interval is fixed, every 4 us. A PHEMT peak detection circuit is used in conjunction with a missing pulse detector/timer to catch all the clipping events. Thus the laser bias current is adjusted automatically at the specific time of the clipping event and for the duration of all the clipping pulses in the event. The controlled increase and decrease of the lasers bias current is DC coupled back into the normal DC bias path via a diode. This gives the anti clipping circuit noise isolation when there are no clipping events and avoids laser clipping during the laser current recovery time as when using an AC coupling scheme.

19 Claims, 7 Drawing Sheets

ANTI CLIPPING CIRCUIT FOR LASER TRANSMITTERS

FIELD OF THE INVENTION

The present invention relates to optical laser transmission systems in general and in particular to a sub-carrier multiplexed signals being launched into a laser. More particularly, the present invention relates to a solution for avoiding clipping of optical communication signals in an optical laser transmission system.

BACKGROUND OF THE INVENTION

MSOs (multi-service operators) provide several services to end users through a fiber optic network, with the final connection to the user through a coaxial connection. The services provided by the MSO typically include broadcast analog video and narrow cast digital services (also referred to as sub-carrier signals), such as data, VoIP, subscription, pay per view and video on demand (VOD) services. The services are generally allocated a portion of an optical channel, which typically has approximately 1 GHz bandwidth available. While the bandwidth of a channel is generally constrained by the optical network (the optical network transmitters, optical fiber, channel filter bandwidths and coaxial connection), the number of users connected to the optical network continues to increase, which requires increased demand for bandwidth for the desired services.

In recent years wavelength division multiplexed (WDM) optical transmission systems have been increasingly deployed in optical networks to meet the increased demand for bandwidth by providing more than one optical channel over the same optical fiber. The WDM techniques include coarse wavelength division multiplexed (CWDM) and dense wavelength division multiplexed (DWDM) systems. Whether a system is considered to be CWDM or DWDM simply depends upon the optical frequency spacing of the channels utilized in the system.

FIG. 1 shows a simplified block diagram of conventional WDM transmission arrangements. As illustrated in FIG. 1, data or other information-bearing signals S1, S2, S3 and S4 are respectively applied to the inputs of modulators $210_1$, $210_2$, $210_3$, and $210_4$. The modulators $210_1$, $210_2$, $210_3$, and $210_4$, in turn, drive lasers $212_1$, $212_2$, $212_3$, and $212_4$, respectively. The lasers $212_1$, $212_2$, $212_3$, and $212_4$ generate data modulated optical channels at wavelengths $\lambda_1$, $\lambda_2$, $\lambda_3$ and $\lambda_4$, respectively. A wavelength division multiplexer (WDM) 214 receives the optical channels and combines them to form a WDM optical signal that is then forwarded onto a single optical transmission path 240.

Narrowcast signals may be RF frequency multiplexed into broadcast channels. The narrowcast signals are typically digital signals and are normally much lower in amplitude than broadcast video signals. The arrangement of sending the same broadcast signal and different narrowcast signals over multiple wavelengths (WDM) is a means of providing more segmentation in an optical network. Typically, the lasers $212_1$, $212_2$, $212_3$, and $212_4$ each receive a different narrowcast signal. The wavelengths carrying the combined broadcast and individual narrow cast signals, $\lambda_1$, $\lambda_2$, $\lambda_3$ and $\lambda_4$, respectively, are optically multiplexed onto optical fiber 240.

When the modulators $210_1$, $210_2$, $210_3$, or $210_4$ RF carriers over drive the laser, (e.g. drive the laser to produce laser pulses having an amplitude greater than the network or laser tolerances), clipping events will happen. The clipping events significantly impact a quadrature amplitude modulation (QAM) signal. Usually clipping will increase the bit error rate (BER) of the QAM signal. Although most QAM receivers use forward error correction (FEC), if the BER is too high, even FEC cannot recover the signal. When that happens the information may be lost.

One approach to avoid clipping is to use a delay line circuit and high speed peak detector to reduce the clipping events. The sub-carrier multiplexed signal passes through an RF delay line before being applied to the laser. Before the sub-carrier multiplexed signal goes to the delay line, a high speed peak detector is used to detect the clipping peak. The laser current is increased relatively slowly to prevent the bias current from producing signals at frequencies within the transmission band. Because the delay time is relatively long, the physical size of the coaxial delay line and the RF loss of the delay line make it difficult to be implemented.

Another approach is disclosed in U.S. Pat. No. 6,549,316 to Henry A. Blauvelt, which describes an anti clipping circuit which does not require significant delay of the main RF signal. The circuit design was based on statistical measurements of measured clipping events. The design includes a diode peak detection circuit that preferably generates a laser bias control signal that is proportional to the frequency and intensity of the clipping events, which is AC coupled to the lasers DC bias circuit. The approach also assumes that the clipping events happen randomly.

Accordingly, an improved method and apparatus for reducing clipping distortion is needed for a laser transmitter for reducing the BER of QAM signal transmitting.

SUMMARY OF THE INVENTION

The invention is directed toward a circuit design based on actual clipping measurements showing the specific time and duration of the clipping events are random. Once a clipping event occurs, the individual clipping pulse timing is fixed, such as by every 4 microseconds. When a clipping event is detected, the laser bias current/voltage gradually increased over about a couple of microseconds, so the pulse will not produce spurious signals within the CATV frequency band. Once it is detected that the clipping events are over, the laser bias current is gradually reduced to its original value. Thus the laser bias current is adjusted automatically according to the specific time of the clipping events and the duration of the clipping period of the events.

The increase of lasers bias current is DC coupled into the main laser DC bias circuit. One advantage of doing so is that when there are no clipping events, the PHEMT peak detected circuit noise can be isolated from the laser DC bias power supply by a reverse biased diode. Another advantage of DC coupling into the main laser DC bias is that when the clipping events are over, there is essentially no recovery time for the laser bias so that it will not cause additional clipping events during the laser current recovery time as may occur with AC coupling.

In accordance with an apparatus of the present invention, a laser transmitter may comprise: a modulator configured to receive a communication signal and provide a modulated signal; a laser configured to provide an optical communication signal based on the modulated signal; and an anti clipping unit configured to reduce clipping of the optical communication signal by controlling a parameter associated with the laser, wherein the anti clipping circuit is configured to periodically remove a clipping event after a random clipping event is detected. In the laser transmitter, the parameter associated with the laser includes a bias current or voltage of the laser. The anti clipping unit may include a pseudomorphic HEMT transistor. The anti clipping unit may include a missing pulse detector associated with a timer. The anti clipping unit may include transistors which convert a timer control signal associated with the missing pulse detector to increase a current to the laser. The anti clipping unit may be isolated from the laser during periods of no clipping.

In accordance with an apparatus of the invention, an anti clipping unit may comprise: a PHEMT peak detector; a missing pulse detector; and an isolation diode which isolates the anti clipping unit from a laser bias source, wherein the anti clipping circuit is configured to periodically remove a clipping event after a random clipping event is detected by controlling a parameter associated with the laser. The parameter associated with the laser may include a bias current or voltage of the laser. The PHEMT unit may include a pseudomorphic HEMT transistor. The missing pulse detector may include a timer. The anti clipping unit may further include transistors which convert a timer control signal associated with the missing pulse detector to increase a current to the laser. The anti clipping unit may be isolated from the laser during periods of no clipping.

In accordance with a method of the present invention for reducing clipping events in an optical communication system using an anti clipping unit comprising the steps of: detecting a random clipping event; removing clipping events after the random clipping event by controlling a parameter associated with a laser in the optical communications system; and isolating the anti clipping unit from the laser when clipping events are no longer occurring. The clipping events may include at least one pulse in a 4 microsecond interval. The parameter associated with the laser may include a bias current or voltage of the laser. The step of removing clipping events may include triggering a missing pulse timer for an appropriate duration. The step of removing clipping events may include increasing a bias current or voltage of the laser. The bias current or voltage of the laser may be increased gradually so that the increased pulse does not produce spurious signals within a predetermined frequency band.

The anti clipping unit of the invention may be used with a laser transmitter used to transmit sub-carrier multiplexed signals for CATV applications. When the anti clipping circuit is used, previously uncorrectable signals can be recovered so that an error free digital signal transmission can be realized. The laser bias current is adjusted automatically at the specific time of the clipping event and for the duration of all the clipping pulses in the event. The controlled increase and decrease of the lasers bias current is DC coupled back into the normal DC bias path via a diode. This gives the anti clipping circuit noise isolation when there are no clipping events and avoids laser clipping during the laser current recovery time as when using an AC coupling scheme. There is essentially no laser bias recovery time for this design and it can be used in any wavelength laser transmitters.

DETAILED DESCRIPTION

The anti clipping unit of the invention may be used with a laser transmitter used to transmit sub-carrier multiplexed signals for CATV applications. When the anti clipping circuit is used, previously uncorrectable signals can be recovered so that an error free digital signal transmission can be realized. The circuit design based on actual clipping measurements showing the specific time and duration of the clipping events are random. Once a clipping event occurs, the individual clipping pulse timing is fixed, such as by every 4 microseconds. A pseudomorphic HEMT transistor (PHEMT) peak detection circuit is used in conjunction with a missing pulse detector/timer to catch all the clipping events. Once it detects a clipping event, the missing pulse detector is triggered which will increase the laser bias current/voltage. The laser bias is gradually increased over about a couple of microseconds, so the pulse will not produce spurious signals within the CATV frequency band. The missing pulse detector will be triggered while the clipping events exist so the laser bias current stays higher to eliminate subsequent clipping events.

Once the pulse detector determines that the clipping events are over, the missing pulse detector timer is de-triggered. The laser bias current is gradually reduced to its original value. Thus the laser bias current is adjusted automatically according to the specific time of the clipping events and the duration of the clipping period of the events. The increase of lasers bias current is DC coupled into the main laser DC bias circuit. One advantage of doing so is that when there are no clipping events, the PHEMT peak detected circuit noise can be isolated from the laser DC bias power supply by a reverse biased diode. Another advantage of DC coupling into the main laser DC bias is that when the clipping events are over, there is essentially no recovery time for the laser bias so that it will not cause additional clipping events during the laser current recovery time as may occur with AC coupling.

The circuit design is based on actual clipping measurements showing the specific time and duration of the clipping events is random. A PHEMT peak detection circuit is used in conjunction with a missing pulse detector/timer to catch all the clipping events. Thus the laser bias current is adjusted automatically at the specific time of the clipping event and for the duration of all the clipping pulses in the event. The controlled increase and decrease of the lasers bias current is DC coupled back into the normal DC bias path via a diode. This gives the anti clipping circuit noise isolation when there are no clipping events and avoids laser clipping during the laser current recovery time as when using an AC coupling scheme. There is essentially no laser bias recovery time for this design and it can be used in any wavelength laser transmitters.

Figure 1:
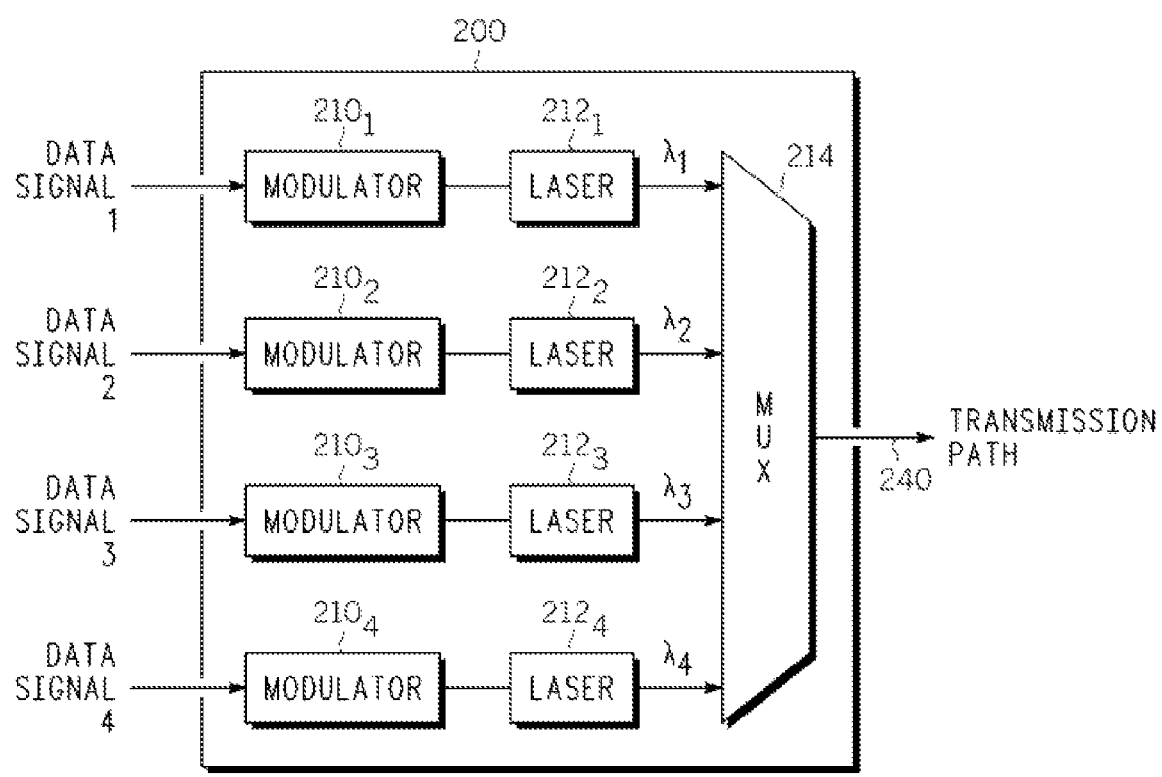
FIG. 1 shows a simplified block diagram of a conventional WDM transmission arrangement.
Figure 2:
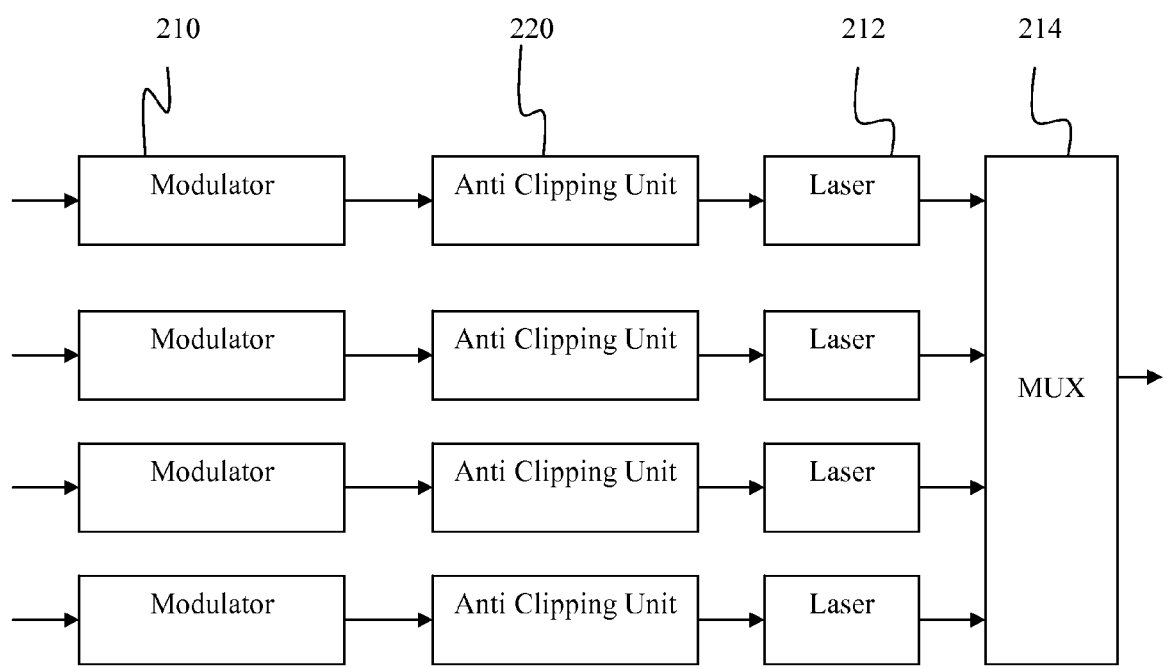
FIG. 2 shows an exemplary arrangement for a WDM transmission system in accordance with the invention.

FIG. 2 illustrates an exemplary WDM transmission unit in accordance with the invention. The WDM transmission unit may be a CWDM or DWDM transmission unit. As illustrated, modulator 210 provides a modulated signal to anti clipping unit 220. The modulated signal may be a combined narrow cast (digital or analog) and broadcast (digital or analog) signal. The anti clipping unit monitors the modulated signal for clipping events as discussed in detail below. If no clipping events occur, the modulated signal is provided to a laser 212 which produces an optical signal based on the modulated signal. The optical signal is provided to optical multiplexer. If a clipping event occurs, the anti clipping unit controls a parameter of the laser, such as the bias current or voltage, to avoid clipping the modulated signal.

While anti clipping unit 220 is illustrated as being separated from modulator 210, the arrangement illustrated is only for discussion purposes. Those of skill in the art will appreciate that the anti clipping unit 220 may be integrally formed with modulator 210. Also, the anti clipping unit may be used with any laser transmission system, including single laser transmission systems, and is not confined to WDM laser transmission systems. Further, the anti clipping unit may be used to monitor and correct clipping events in both the broadcast and sub-carrier signals, anti clipping unit may be positioned to monitor and correct clipping events only in the sub-carrier signals or only in the broadcast signals.

Our experiment test results showed that when a laser is modulated by multi-channel signals the clipping events will happen at a random time. Once a clipping event does happen, every 4 micro sec the second clipping event will follow. How many clipping events (e.g. 4 micro sec pulses) will follow the first clipping event will be also random. Our circuit design is based on actual clipping measurements which show the specific time and duration of the clipping events are random. Once the clipping events happen, the individual clipping pulses timing is fixed, for example at every 4 µs.

A PHEMT peak detection circuit is used in conjunction with a missing pulse detector/timer to catch all the clipping events. Once it detects a clipping event, the missing pulse detector is triggered which will increase the laser bias current/voltage. The laser bias is gradually increased over about a couple of microseconds, so the pulse will not produce spurious signals within CATV frequency band. In a preferred implementation, the missing pulse detector will be always triggered while the clipping events exist so the laser bias current stays higher to eliminate subsequent clipping events. Once the pulse detector determines that the clipping events are over, the missing pulse detector timer is de-triggered. The laser bias current is gradually reduced to its original value. Thus the laser bias current is adjusted automatically according to the specific time of the clipping events and the duration of the clipping period of the events. The increase of lasers bias current is DC coupled into the main laser DC bias circuit. One advantage of doing so is that when there are no clipping events, the PHEMT peak detected circuit noise can be isolated from the laser DC bias power supply by a reverse biased diode. Another advantage of DC coupling into the main laser DC bias is that when the clipping events are over, there is essentially no recovery time for the laser bias so that it will not cause additional clipping events during the laser current recovery time which may occur with AC coupling.

An implementation of the invention uses the nonlinear effect of low noise high speed Enhancement Mode Pseudomorphic HEMT (PHEMT) transistor to detect the clipping events. A missing pulse detector of a timer may be used to automatically adjust for the random number of 4 micro second pulses, such as the missing pulse detector of a NE 555 timer. A transistor arrangement may be used to convert the timer control signal to increase the laser current so that best anti clipping results can be obtained. The DC coupling circuit may be used for the laser current.

When there are not any clipping events, the anti clipping circuit is disconnected to the laser bias circuit because they are isolated by (e.g. reverse biased) a diode. So the anti clipping circuit noise will not enter into the laser transmitter. Once the clipping events are coming, these two circuits are connected by the forward bias diodes. Once the clipping event is over, the laser current is set back to its original value. There is essentially no laser bias recovery time for this design and it can be used in 1310 nm and 1550 nm laser transmitters.

Figure 3A:
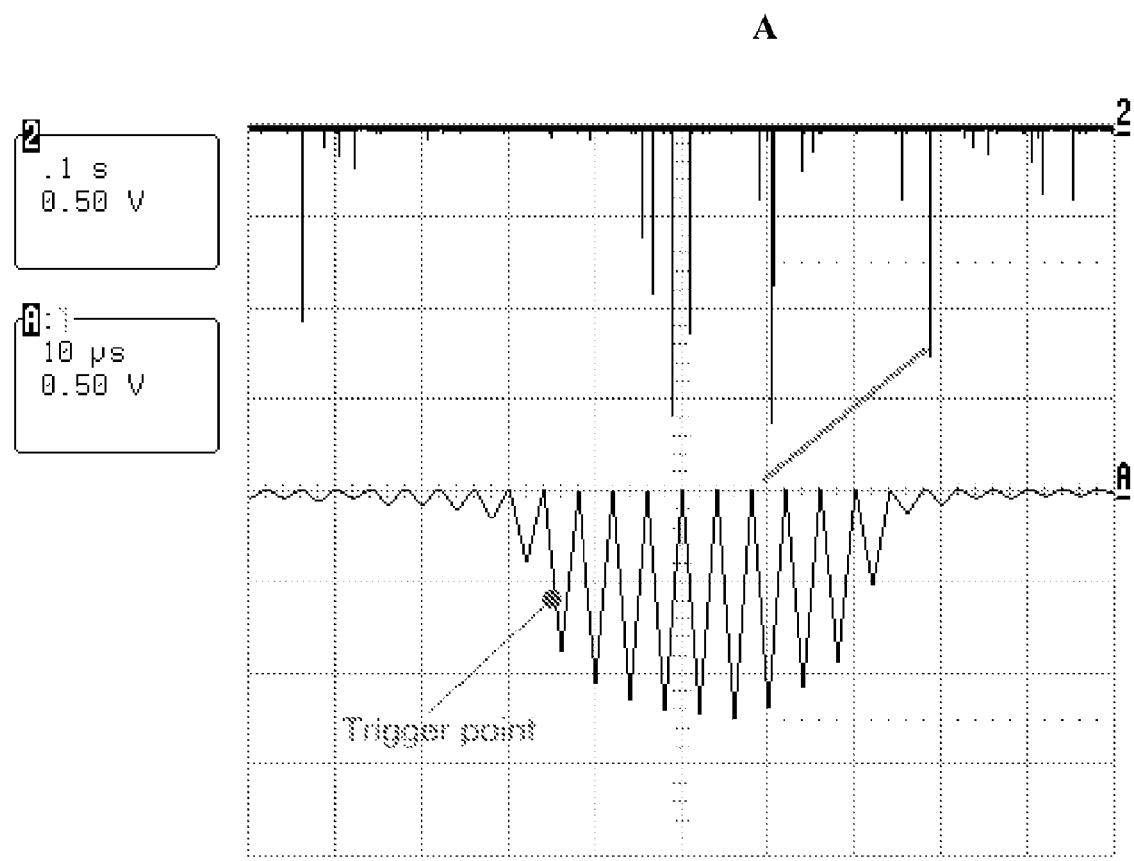
FIG. 3A-3C show experimental test results for clipping event measurements.
Figure 3B:
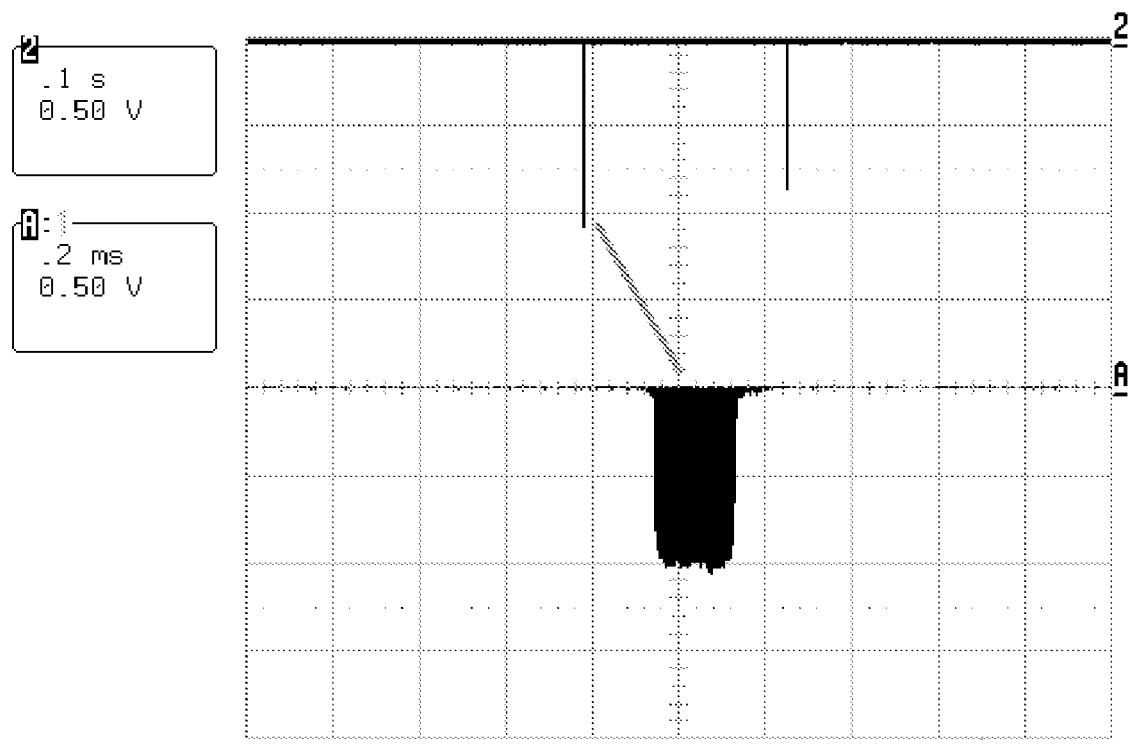
Figure 3C:
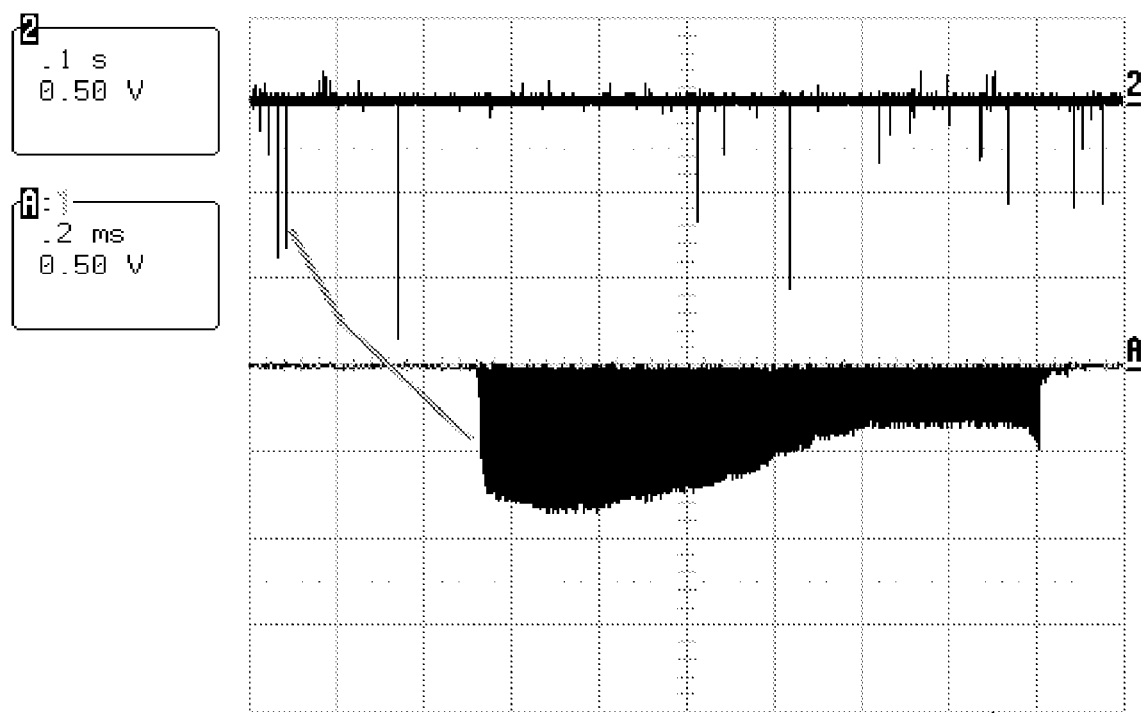

FIGS. 3A-3C illustrate experimental results of our PHEMT peak detection output waveforms. The input RF signals are sub-carrier multiplexed signals which includes 55-550 MHz, (79 analog CATV channels), plus 550 MHz-1 GHz, (75 analog channels), which are 6 dB down in RF power compared with the 55-550 MHz channels.

The upper trace in FIG. 3A shows the negative pulses produced by the PHEMT peak detector. As illustrated in FIG. 3A, the clipping events are totally random. The upper trace in FIG. 3A has a scale of 0.1 sec. and 0.5 V. The lower trace in FIG. 3A is an expanded view of this specific clipping event pulse and has a scale of 10 microseconds and 0.5V. FIG. 3A is an experimental plot with NPN silicon RF transistor BFP420 (Q2), at 11V, 1K ohm collector resistance. It can be seen that each pulse is composed of many pulses with time interval of 4 µs. From many testing results, we have found the clipping events periods can range from one pulse (4 µs) to hundreds of pulses (about 1 ms). FIG. 3A represents a short period example.

FIG. 3B represents a middle period example with the upper trace at a scale of 0.1 sec. and 0.5 V, and the lower trace in FIG. 3B is an expanded view of this specific clipping event pulse and has a scale of 0.2 msec. and 0.5V. FIG. 3B is an experimental plot with NPN silicon RF transistor BFP420 (Q2), at 11V, 1K ohm collector resistance. It can be seen that each pulse is composed of many pulses with time intervals of 4 µs.

FIG. 3C represents a long period example with the upper trace at a scale of 0.1 sec. and 0.5 V, and the lower trace in FIG. 3C is an expanded view of this specific clipping event pulse and has a scale of 0.2 msec. and 0.5V. FIG. 3B is an experimental plot with BFP420, at 11V, 1K ohm col. resolution.

In FIGS. 3B and 3C, the longer pulse widths do not allow individual 4 µs period to be displayed. If we did expand further, they would also display 4 µs pulses as in the lower trace of FIG. 3A.

A trigger point is denoted in FIG. 3A which indicates a trigger point for the anti clipping unit to detect a clipping event. The anti clipping unit will continue to detect a clipping event as long as the amplitude of the voltage is greater than the trigger point. In this manner, the anti clipping unit automatically adjusts for the random duration of the clipping events, e.g. the random number of clipping pulses within a clipping event.

Figure 4:
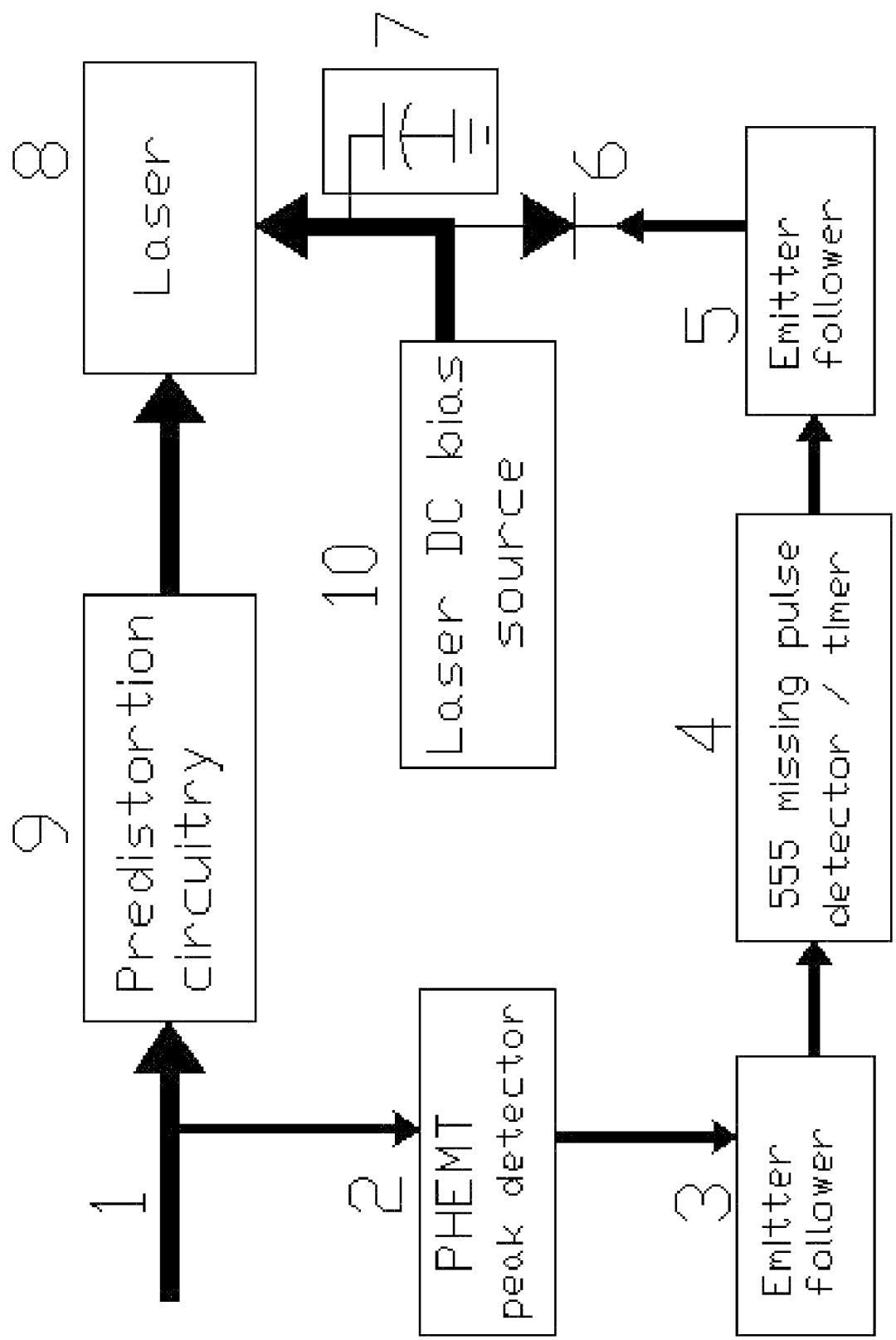
FIG. 4 illustrates an exemplary system block diagram of an anti clipping arrangement in a optical transmission system in accordance with the principles of the invention.

FIG. 4 is a system block diagram of an optical transmission system that includes a PHEMT peak detector, 2; and an emitter follower, 3; a missing pulse detector/timer, 4; an emitter follower, 5; a laser DC bias power source, 10; the laser, 8; and a Schottky diode, 6; which DC couples the anti-clipping current pulse to the laser. The capacitor, 7; used in this diagram controls the rise and fall times of the anti clipping current pulse fed to the laser; and the CSO and CTB inline predistortion circuits, 9.

Figure 5:
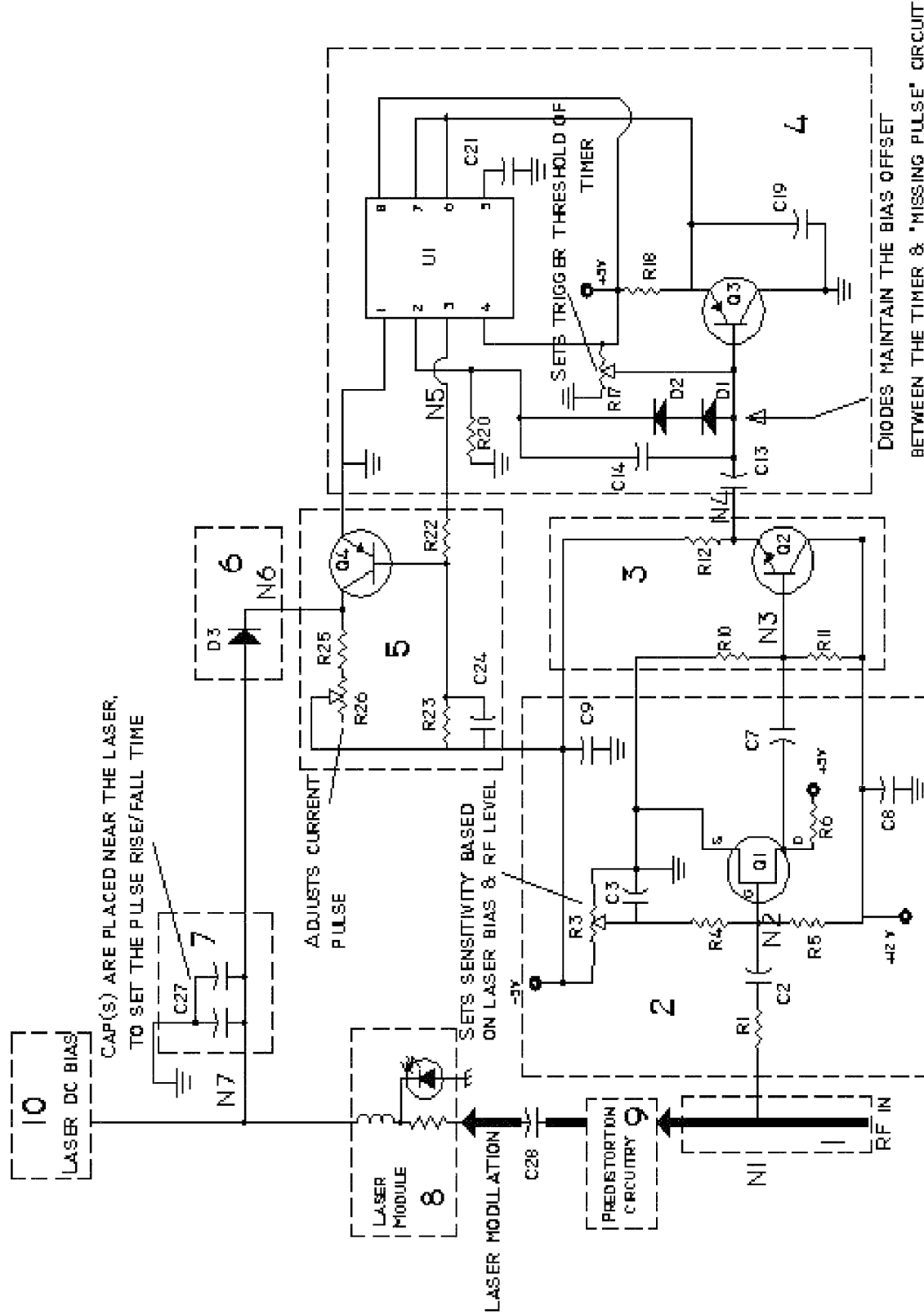
FIG. 5 illustrates an exemplary circuit diagram of the anti clipping arrangement of FIG. 4.

FIG. 5 is a circuit diagram for the anti clipping circuit, with the details of the predistortion circuit 9 omitted. N1 is the RF drive power input going to the laser and the anti clipping circuit in parallel. The RF passes through the predistortion circuit, 9, (CSO and CTB correction), and capacitor C28 to the laser, 8, which is biased by the lasers DC bias supply, 10. In this discussion, we are assuming the laser anode is grounded as shown in the diagram. The RF input is also coupled via resistance R1 and capacitor C2 to the gate of the transistor Q1, which is a PHEMT. R1 isolates the anti-clipping circuit from the predistortion circuit so that no matter how the PHEMT behaves, the predistortion circuit performance is unaffected. C2 AC couples the RF signal to the PHEMT. The PHEMT, (ATF-55143), is a low noise enhancement mode pseudomorphic HEMT in a surface mount plastic package. The resistors R3, R4, and R5 set the bias for the PHEMT gate voltage.

The PHEMT is biased so that non clipping RF levels do not bring Q1 into conduction, e.g. there is no current flow in the drain of transistor Q. Only when the RF input voltage is positive enough to drive the laser, 8, into clipping will the PHEMT start to conduct. The current flow in the resistor R6 will cause the voltage at N3 to go negative. The clipping negative pulse on N3 is passed to the emitter follower Q2, to N4. This is what we see in the negative pulses of FIGS. 3A-3C. The negative clipping pulses are passed via C13 and C14 to a standard missing pulse timer circuit used in the industry.

The adjustable resistor, R17, is used to adjust the triggering level for the 555 timer circuit shown in FIG. 5. The trigger point can be adjusted according to need. D1/D2 is used for simplifying the bias voltage offset from SE 555 timer pin 2 and the Q3 base bias for proper function of the missing pulse/timer circuit. R18 and C19 are used as a delay time constant for the timer. Once the timer is triggered, the voltage on C19 will increase according to the delay time constant. Once the voltage on the C19 gets to predetermined voltage, the timer will be de-triggered. Q3 is used with a 555 timer to form a missing pulse timer circuit.

When the negative pulse on N4 is passed to the Q3 base, the negative pulse will cause Q3 to conduct, thus discharging C19. The time constant choice for the C19/R18 is larger than 4 µs. As long as the 4 µs negative pulses exist, the voltage on the capacitor C19 will never get to the predetermined de-trigger point. The missing pulse timer will remain triggered until all the 4 µs clipping pulses are gone.

Once the 4 µs negative pulses exist, the missing pulse timer is triggered. The timer 555 pin 3 (N5) will output a high voltage (about 5 volts). It will cause the transistor Q4 to cutoff. When the transistor Q4 has been cut off, the negative 5 volt source will provide the additional laser current through resistance R25/26 and diode D3, (DC coupled), to the laser, 8. By controlling the value of the resistor, R25, the additional current to the laser can be controlled. Resistance R25 and capacitor C27 form a low pass filter with a time constant of about 1 µs. It makes the anticlipping current pulse increase and decrease gradually over a couple of microseconds.

When the missing pulse timer finds the input clipping event is over, the missing pulse timer will be de-triggered. In this case, the timer pin 3, (N5), will be at a low voltage (0 volts). The transistor Q4 will be conducting. The voltage on the N6 will be higher than the lasers normal forward bias voltage (about −2 volts), derived from the laser power supply, 10. In this case, the voltage on the N6 is higher than the voltage drop on the N7. Thus, diode D3 is reversed biased, so any noise created by the anti clipping circuit will be isolated from the laser. This also prevents any laser clipping during the laser current recovery time as when using an AC coupling scheme.

The anti clipping unit of the invention may be used with a laser transmitter used to transmit sub-carrier multiplexed signals for CATV applications. When the anti clipping circuit is used, previously uncorrectable signals can be recovered so that an error free digital signal transmission can be realized. The circuit design is based on actual clipping measurements showing the specific time and duration of the clipping events is random. A PHEMT peak detection circuit is used in conjunction with a missing pulse detector/timer to catch all the clipping events. Thus the laser bias current is adjusted automatically at the specific time of the clipping event and for the duration of all the clipping pulses in the event. The controlled increase and decrease of the lasers bias current is DC coupled back into the normal DC bias path via a diode. This gives the anti clipping circuit noise isolation when there are no clipping events and avoids laser clipping during the laser current recovery time as when using an AC coupling scheme. There is essentially no laser bias recovery time for this design and it can be used with any wavelength laser transmitters.

We claim:

1. A laser transmitter comprising:
    a modulator configured to receive a communication signal and provide a modulated signal;
    a laser configured to provide an optical communication signal based on the modulated signal; and
    an anti clipping unit configured to reduce clipping of the optical communication signal by controlling a parameter associated with the laser,
    wherein the anti clipping unit is configured to periodically remove a clipping event after a random clipping event is detected, and
    wherein the anti clipping unit includes a missing pulse detector associated with a timer.

2. The laser transmitter of claim 1, wherein the parameter associated with the laser includes a bias current or voltage of the laser.

3. The laser transmitter of claim 1, wherein the anti clipping unit includes a pseudomorphic HEMT transistor.

4. The laser transmitter of claim 1, wherein anti clipping unit includes transistors which convert a timer control signal associated with the missing pulse detector to increase a current to the laser.

5. A laser transmitter comprising:
    a modulator configured to receive a communication signal and provide a modulated signal;
    a laser configured to provide an optical communication signal based on the modulated signal; and
    an anti clipping unit configured to reduce clipping of the optical communication signal by controlling a parameter associated with the laser,
    wherein the anti clipping unit is configured to periodically remove a clipping event after a random clipping event is detected,
    wherein the anti clipping unit is isolated from the laser during periods of no clipping, and
    wherein the anti clipping unit includes a missing pulse detector associated with a timer.

6. The laser transmitter of claim 5, wherein the parameter associated with the laser includes a bias current or voltage of the laser.

7. The laser transmitter of claim 5, wherein the anti clipping unit includes a pseudomorphic HEMT transistor.

8. An anti clipping unit comprising:
    a PHEMT peak detector;
    a missing pulse detector; and
    an isolation diode which isolates the anti clipping unit from a laser bias source,
    wherein the anti clipping unit is configured to periodically remove a clipping event after a random clipping event is detected by controlling a parameter associated with the laser, and
    wherein the missing pulse detector is associated with a timer.

9. The anti clipping unit of claim 8, wherein the parameter associated with the laser includes a bias current or voltage of the laser.

10. The anti clipping unit of claim 8, wherein the PHEMT unit includes a pseudomorphic HEMT transistor.

11. The anti clipping unit of claim 8, wherein the missing pulse detector includes a timer.

12. The anti clipping unit of claim 11, wherein anti clipping unit further includes transistors which convert a timer control signal associated with the missing pulse detector to increase a current to the laser.

13. The anti clipping unit of claim 8, wherein the anti clipping unit is isolated from the laser during periods of no clipping.

14. A method of reducing clipping events in an optical communication system using an anti clipping unit comprising the steps of:

detecting a random clipping event using a detector;

removing clipping events using the anti clipping unit after the random clipping event by controlling a parameter associated with a laser in the optical communications system; and isolating the anti clipping unit from the laser when clipping events are no longer occurring, and wherein the anti clipping unit includes a missing pulse detector associated with a timer.

15. The method of claim 14, wherein the clipping events include at least one pulse in a 4 microsecond interval.

16. The method of claim 14, wherein the parameter associated with the laser includes a bias current or voltage of the laser.

17. The method of claim 14, wherein the step of removing clipping events includes triggering a missing pulse timer for a predetermined duration.

18. The method of claim 14, wherein the step of removing clipping events includes increasing a bias current or voltage of the laser.

19. The method of claim 18, wherein the bias current or voltage of the laser is increased gradually so that the increased pulse does not produce spurious signals within a predetermined frequency band.

\* \* \* \* \*